United States Patent
Raichle et al.

(10) Patent No.: US 6,931,936 B2
(45) Date of Patent: Aug. 23, 2005

(54) APPARATUS AND METHOD FOR DETERMINING PRESSURE AND VACUUM

(75) Inventors: Kurt Raichle, Owatonna, MN (US);
Corey Ermer, Waseca, MN (US);
Phillip McGee, Owatonna, MN (US);
Robert Kochie, Mantorville, MN (US)

(73) Assignee: SPX Corporation, Charlotte, NC (US)

( * ) Notice: Subject to any disclaimer, the term of this patent is extended or adjusted under 35 U.S.C. 154(b) by 211 days.

(21) Appl. No.: 10/141,130

(22) Filed: May 9, 2002

(65) Prior Publication Data

US 2003/0122548 A1 Jul. 3, 2003

Related U.S. Application Data

(60) Provisional application No. 60/342,363, filed on Dec. 27, 2001.

(51) Int. Cl.⁷ .................................................. G01L 9/00
(52) U.S. Cl. ............................ 73/753; 73/756; 73/700
(58) Field of Search ................................... 73/700–756

(56) References Cited

U.S. PATENT DOCUMENTS

D295,148 S    4/1988 Curneen et al. ............. D10/57
5,141,403 A * 8/1992 Guo et al. ................... 417/45
5,284,180 A * 2/1994 Guo et al. ................. 137/488
6,266,995 B1 * 7/2001 Scott ........................... 73/23.2

FOREIGN PATENT DOCUMENTS

JP         10107609 A  *  4/1998  ......... H03K/17/94

OTHER PUBLICATIONS

Fluke PV 350 Pressure/Vacuum Transducer Module Instruction Sheet; May 1992, Rev. 4, Sep. 1997.

* cited by examiner

Primary Examiner—William Oen
Assistant Examiner—Jermaine Jenkins
(74) Attorney, Agent, or Firm—Baker & Hostetler LLP

(57) ABSTRACT

An apparatus and method for determining pressure and vacuum comprising an adapter that links to a digital tester. The adapter is comprised of at least one pressure sensor, a power source, converter and an interface cable. The pressure sensor attaches to the system to be measured. The detected pressure is transmitted to the adapter and then to the digital tester for displaying to the user. The apparatus can detect pressure beyond 500 pounds per square inch.

24 Claims, 5 Drawing Sheets

APPARATUS AND METHOD FOR DETERMINING PRESSURE AND VACUUM

PRIORITY

This application claims priority to the provisional U.S. patent application entitled, PRESSURE AND VACUUM ADAPTER, filed Dec. 27, 2001, having a Ser. No. 60/342,363, the disclosure of which is hereby incorporated by reference.

FIELD OF THE INVENTION

The present invention relates generally to measuring pressure. More particularly, the present invention relates to the use of an adapter with a digital automotive tester to determine pressure.

BACKGROUND OF THE INVENTION

Rapid and easy testing of internal combustion piston engines is becoming more and more desirable both in the automotive industry, such as manufacturers and engine repair establishments, in which full automation is not really feasible. In present-day engine-manufacture and diagnosing, testing of each and every engine component and its subsystems is preferred over sample testing. However, because of the high expense of labor and diagnostic equipment, this is not always feasible or possible. In the present-day engine-repair establishments, which cannot be fully automated, it is this high cost of manual labor and overhead which limits the time which can be spared for testing any given engine or subsystem. Therefore, there is need for devices that accurately detect and measure various conditions of an engine.

To help diagnosis engine or mechanical trouble in certain areas, the measuring of pressure or vacuum is conducted. Systems such as fuel injection, transmission and engine compression all incorporate the use of pressure. Venting, among many other uses in the vehicle, incorporate the use of vacuum and vacuum lines.

For example, the fuel injection is a system for spraying fuel into the cylinders of gasoline and diesel engines. When used on gasoline engines, it replaces the carburetor, a device that mixes air and fuel. On most gasoline engines that use fuel injection, a pump forces fuel under high pressure to a nozzle located at each cylinder. The nozzles spray the fuel into an intake port (chamber) near each cylinder. There, the fuel partially mixes with air before a valve opens to admit the mixture into the cylinder. The fuel may be injected into the intake port in a continuous or periodic stream.

In order for the automobile to operate correctly and in an efficient manner, the fuel injection system needs to maintain an appropriate amount of pressure to force the fuel into the engine. The prior art consists of tools, which are comprised of mechanical gauges and connections that require time and the commitment of valuable resources both financial and non-financial assets. Furthermore, these tools are usually stand-alone units, making them large and bulky. Another downside to these tools is that they only serve one purpose, measuring pressure and vacuum. As a result, business decisions were made as to whether an automotive shop could buy these expensive tools in light of the demand from their customers.

Therefore, there exists a need for an affordable tool that efficiently and accurately determines pressure in various subsystems of mechanical devices.

Accordingly, it is desirable to provide a portable device that is capable of measuring pressure and vacuum measurement as well as perform additional testing procedures.

SUMMARY OF THE INVENTION

In a first aspect of the invention, a tool for determining pressure and vacuum includes a digital tester with a display and an adapter that is linked to the digital automotive tester. The adapter includes a pressure sensor, a power source and a converter. In the preferred embodiment, the pressure sensor is a transducer. The adapter can accommodate more than one pressure sensor. Additionally, the sensors can detect pressure above 500 pounds per square inch.

The adapter through the use of a slide switch, operates between English and metric readings depending on the user's preference. Furthermore, the adapter can contain a portable power source such as a battery.

In another aspect of the invention, a method for measuring pressure and vacuum data in a system includes the steps of connecting at least one pressure sensor to the system to be measured, detecting pressure in the system, transmitting the pressure to an adapter, converting the pressure to a signal to be read by a digital tester, transmitting the signal to the digital tester and displaying the pressure detected by the sensor. Further steps to this method include zeroing the adapter and connecting the adapter to a power source.

In another aspect of the invention, a tool for measuring pressure and vacuum data in a system is provided. The tool includes at least one means for detecting pressure in the system, means for transmitting the pressure to an adapter, means for converting the pressure to a signal to be read by a digital tester, means for transmitting the signal to the digital tester and means for displaying the pressure detected by the sensor. Further elements are means for zeroing the adapter and means for connecting the adapter to a power source.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF PREFERRED EMBODIMENTS OF THE INVENTION

A preferred embodiment of the present invention provides a digital tester that is linked to an adapter for determining pressure and vacuum. The adapter is comprised of a pressure transducer, a cable and a module. The module is linked to the pressure transducer via a cable or interface. The cable provides power from the module to the transducer as well as serve as the conduit for the transducer to transmit pressure readings to the module. The display or output device on the tester displays either positive or negative pressures, with negative readings to be read as indicating vacuum as inches in mercury (Hg). The adapter is capable of indicating pressure measurements in both English and metric standards through the use of the selector switch.

The module further comprises a switch capable of zeroing the adapter and transducer so that digital tester reads zero pounds per square inch (psi) or Hg. This aids in ensuring that the basis for measurement of pressure is zero. This eliminates possible errors in determining the true reading.

The pressure adapter consists of a module with an interface cable, which connects to a pressure transducer. The module contains a nine-volt battery and a low battery indicator. The indicator, in the preferred embodiment, is a light emitting diode (LED). The nine-volt battery provides power to the transducer so that is able to read or measure the pressure or vacuum.

In the preferred embodiment, the invention allows the user to interchangeable use two pressure transducers of differing sensitivity. The invention is not limited to the transducers used in the preferred embodiment. One of the transducers used in the preferred embodiment has a range of measurement from 29.9 Hg to 3000 psi range. The other transducer has a range of measurement form 30 Hg to 500 psi. The adapters chosen by the user are more a function of their needs than a limitation of the current invention. With each pressure sensor, the adapter achieves a basic accuracy measurement of 0.5%. The invention uses pressure transducers manufactured by HONEYWELL™. The transducers incorporated in the invention are model numbers ML500P52PC for the 500 psi range and ML03KPS2PC for the 3000 psi range.

Figure 1:
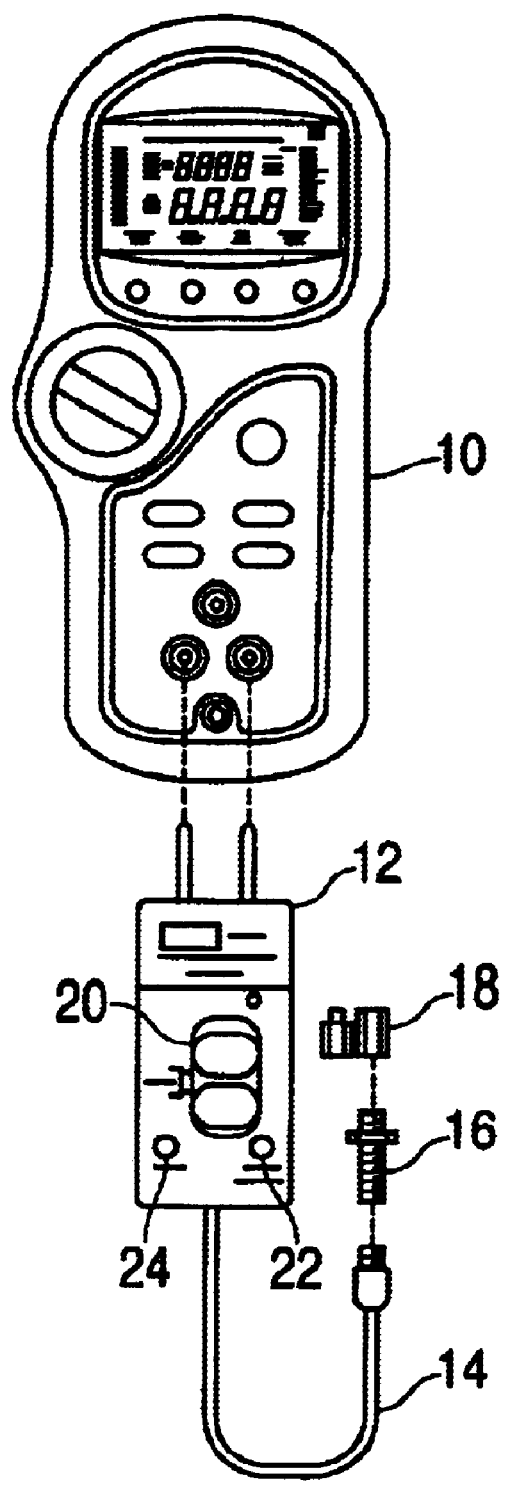
FIG. 1 is a view illustrating several elements of a preferred embodiment of the present invention.

FIG. 1 is a view illustrating several elements of a preferred embodiment of the present invention. The preferred embodiment is comprised of a digital tester 10 that is linked to a digital adapter 12. The digital tester, in this embodiment, is a digital multimeter. Extending from the adapter 12 is an extension or interface cable 14. The cable 14 is connected to a pressure sensor 16 that is connected to a bushing 18. The bushing 18 enables the adapter to connect to the system (e.g., fuel, transmission . . . ) to be measured. The adapter 12 also contains a selector switch 20, which toggles between English, psi, and metric measurements, Pascal. A range switch 22 is provided on the adapter 12 depending on the pressure sensor attached. In the preferred embodiment, the range switch 22 is toggled between a sensor measuring up to 500 psi and a sensor measuring up to 3000 psi. A potentiometer style zero adjuster 24 is provided for the user so that all measurements use zero as the reference point for all measurements.

The pressure sensor 16 detects or senses a pressure. The pressure sensor 16, in the preferred embodiment, uses a pressure transducer, which are commonly known in the art. The pressure sensor 16 detects the pressure in the system to which it is located. In order to detect pressure or vacuum, the cable 14 provides power to the pressure sensor 16. Through activation of the pressure sensor 16, the pressure is detected and reported or transmitted as a function of voltage. This voltage is transmitted from the pressure sensor 16 back to the adapter 12.

As discussed, power is supplied to the pressure sensor 16 through the adapter 12 to the digital automotive tester 10. The extension cable 14 supplies the power and communication medium for the pressure sensor. Therefore, as the pressure increases or decreases into a vacuum, the pressure sensor 14 indicates a voltage to the adapter 12. The voltage detected by the sensor 16 and transmitted back to the adapter 12 is then formatted into a compatible format for the digital tester 10. The actual conversion of the voltage is accomplished by the adapter 12.

Figure 2:
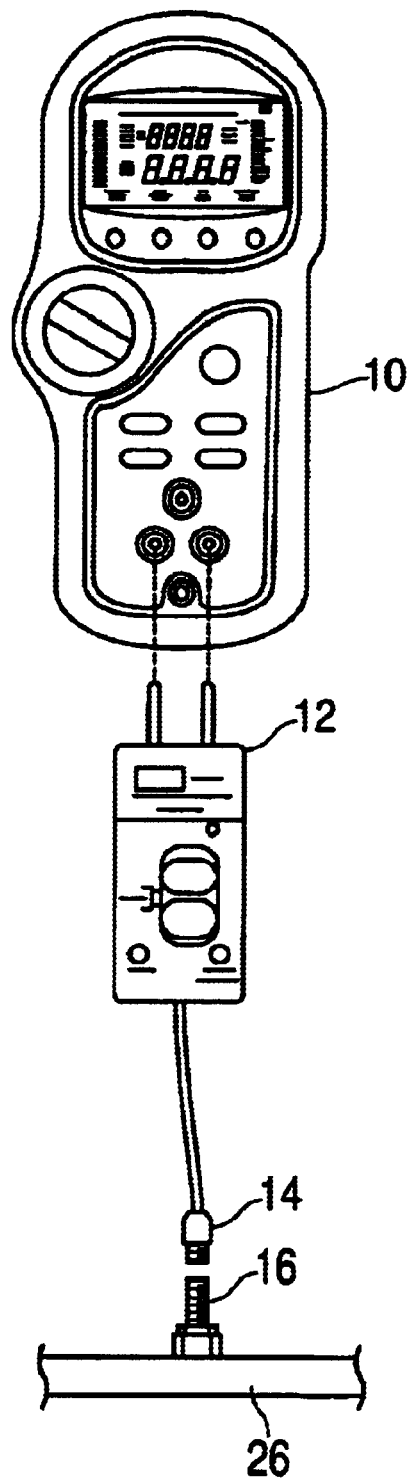
FIG. 2 is an illustration of the preferred embodiment of the present invention for measuring fuel injection pressure.

FIG. 2 is an illustration of the preferred embodiment of the present invention for measuring fuel injection pressure. The digital tester 10 is linked to a digital pressure adapter 12. Extending from the adapter 12 is a cable 14 that is connected to a pressure transducer 16. The pressure transducer 16 is attached to the fuel rail 26 of the automobile in order for the fuel injection pressure to be tested. The fuel rail 26 contains a fitting that enables the adapter 12 to connect the pressure transducer 16. Most vehicles have a fitting or slot that enables a user of the invention to attach to the invention.

Fuel pressure is important for proper vehicle operation. If there is not proper pressure in the fuel rail, then the fuel injectors will not have the proper injection of fuel. As a result, the engine misfires. Improper fuel pressure can also be an indication that the fuel pump is not functioning properly. The current invention is helpful in determining pressure in a subsystem of the car such as the fuel injectors. The results from this analysis aid the user of the device to efficiently and accurately determine the condition of the car.

Figure 3:
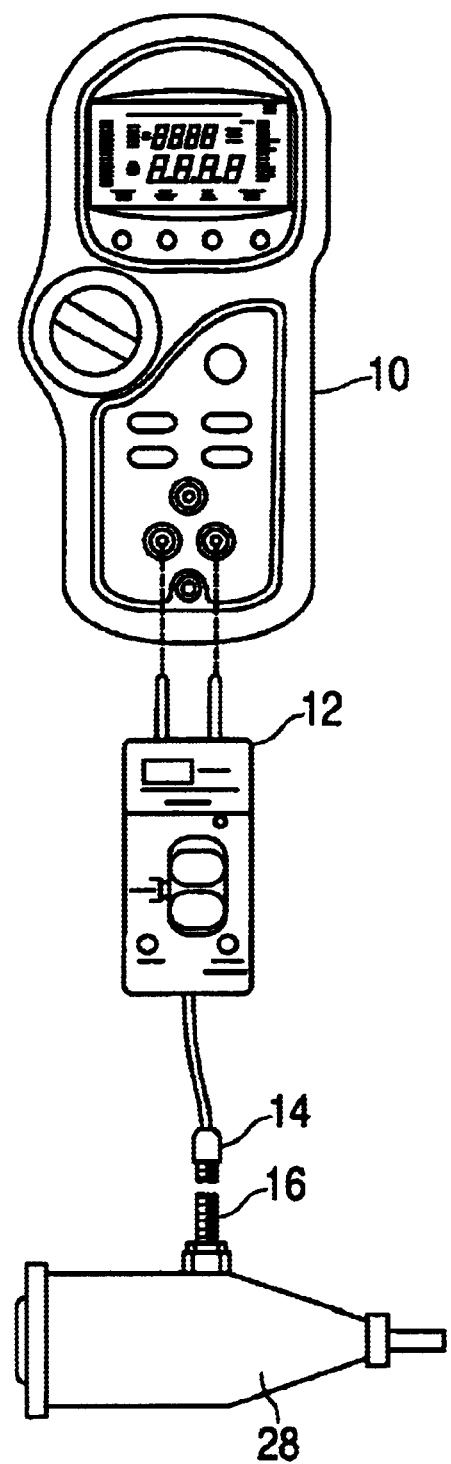
FIG. 3 is an illustration of the preferred embodiment of the present invention for measuring transmission pressure.

FIG. 3 is an illustration of the preferred embodiment of the present invention for measuring transmission pressure. The digital tester 10 is linked to a digital pressure adapter 12. Extending from the adapter 12 is a cable 14 that supplies power and a communication medium to the pressure transducer 16. The pressure transducer 16 is attached to the transmission 28 of the automobile in order for the transmission pressure to be tested. After the connections are made to the transmission, the automobile is started in order to measure the pressure contained therein. The automobile, once started, initiates operation of the transmission pump. The pump causes the transmission fluid to be circulated throughout the transmission. Furthermore, if a transmission cooler is included on the automobile, the pump ensures that the fluid is circulated from the transmission through the cooler back into the transmission. The adapter 12, through the pressure transducer 16, measures the As with fuel pressure, the pressure in the transmission is important in maintaining the life of the transmission. The manufacturer's recommendation for maintaining pressure ensures that the internal transmission pump is directing the transmission fluid throughout. Insufficient pressure can result in the transmission fluid not being circulated in a proper manner. Excessive wear on the transmission usually results in premature failure.

Figure 4:
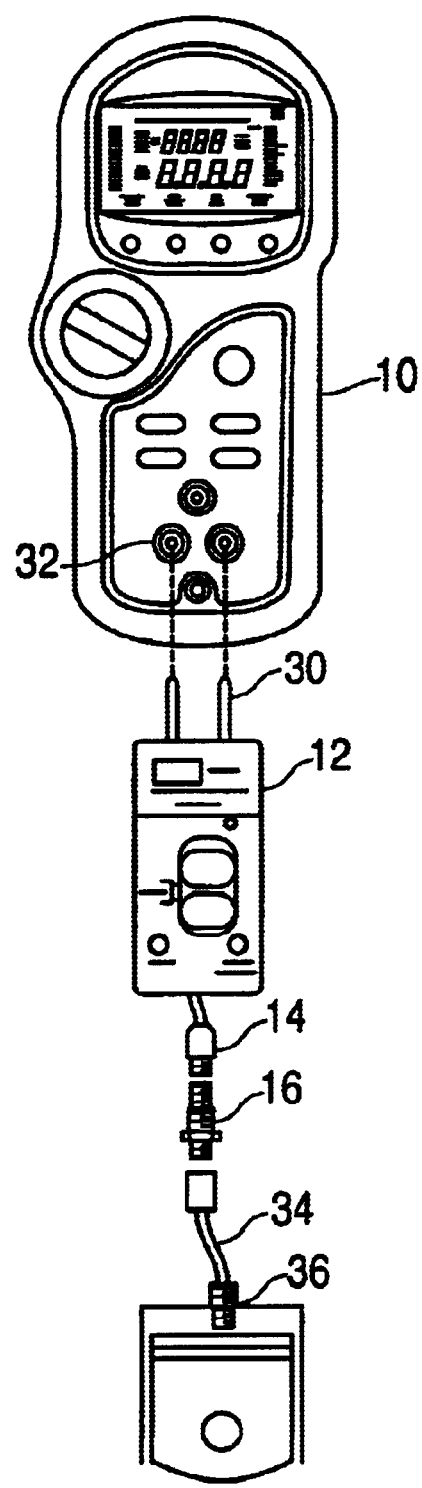
FIG. 4 is an illustration of the preferred embodiment of the present invention for measuring engine compression.

FIG. 4 is an illustration of the preferred embodiment of the present invention for measuring engine compression. In FIG. 4, the digital tester 10 is linked to the digital pressure adapter 12. To measure the engine compression, an adapter 12 connects to the digital tester 10 via male connectors 30 into the female receptacle 32. The link of the connectors 30, 32 and the digital tester 10 enable the two devices to communicate and transmit data.

As an example, the pressure sensor 16 detects the pressure in a fuel injection system. The pressure is transmitted to the adapter 12, where it is converted into a format compatible with the digital tester 10. The converted voltage is transmitted to the digital test's connector 32 via the male connector 30.

The adapter 12 is comprised of a cable that includes a cable that powers and serves as a communication medium for the transducer 16. The pressure transducer 16 is attached to a pressure hose 30, which is connected to a spark plug hole 32. The connection directly to the spark plug hole enables the device to measure or determine the engine compression. After all the connections have been made, the automobile is started in order to measure the pressure contained therein.

Pressure measurement of engine compression ensures that the pistons are operating correctly. For example, if the engine compression is irregular, this could be an indication that the rings on the piston are faulty. In such a situation, the oil from the engine leaks and results in the automobile burning oil.

Figure 5:
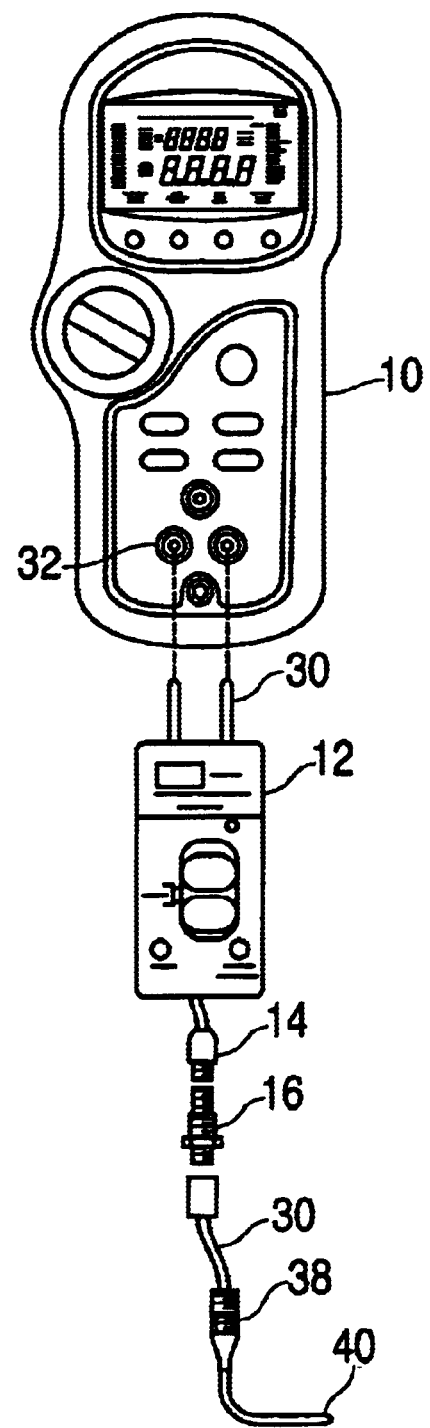
FIG. 5 is an illustration of the preferred embodiment of the present invention for measuring vacuum.

FIG. 5 is an illustration of the preferred embodiment of the present invention for measuring vacuum. The digital tester 10 is linked to a digital pressure adapter 12. Extending from the adapter 12 is a cable 14 that is connected to a pressure transducer 16. The pressure transducer 16 is attached to a pressure hose 30 that is connected to a cone adapter 38, which enables it to link to the automotive vacuum line 40. After all the connections have been made, the automobile is started in order to measure the vacuum contained therein. A reading of vacuum appears as a negative number of the digital tester display. The negative value is equivalent to the same value in Hg.

Vacuum lines appear in a number of different places within older and newer vehicles. One example of a vacuum is in older carburetor vehicles. For these vehicles, once the gas pedal is depressed, the carburetor attempts to put more fuel into the engine. In turn, the transmission is downshifted via vacuum the automatic transmission.

Another example of a vacuum line is the instance where an automobile does not have electronic control of the vents. In the absence of such a system, one of the alternatives is to open and close the vents through the use of vacuum. In either instance, the line must contain a sufficient amount of vacuum for the device to operator properly. The present invention allows a technician to connect the transducer 30 to the vacuum line.

The many features and advantages of the invention are apparent from the detailed specification, and thus, it is intended by the appended claims to cover all such features and advantages of the invention, which fall within the true spirits, and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A tool for determining pressure and vacuum comprising:
    a digital multimeter with a display; and
    an adapter that is linked to the digital multimeter, wherein the adapter is comprised of a power source and a converter and is configured to be linked to the digital multimeter; and
    an interchangeable pressure sensor linked at a distance from the adapter.

2. The tool as in claim 1, wherein the pressure sensor is a transducer.

3. The tool as in claim 1, wherein the power source is a battery.

4. The tool as in claim 1, wherein the adapter measures pressure beyond 500 pounds per square inch.

5. The tool as in claim 1, further comprising a switch for selecting between different standards of measurement.

6. The tool as in claim 5, wherein the standards of measurements are English and metric.

7. The tool as in claim 1, wherein the digital multimeter is a digital automotive tester.

8. The tool as in claim 1, wherein the digital multimeter comprises a selector for choosing the system for which pressure is being measured.

9. The tool as in claim 1, further comprising a zero switch positioned on the adapter.

10. The tool as in claim 9, wherein the zero switch is configured to zero the pressure sensor.

11. The tools as in claim 9, wherein the zero switch is configured to zero the digital multimeter.

12. A method for measuring pressure and vacuum data in a system comprising:
    connecting at least one interchangeable pressure sensor to the system to be measured, the interchangeable pressure sensor is linked apart from an adapter, wherein the adapter, which is configured to be connected to a digital multimeter, is comprised of a power source and a converter;
    detecting pressure in the system with the pressure sensor;
    transmitting the pressure to the adapter;
    converting the pressure at the adapter to a signal to be read by the digital multimeter;
    transmitting the signal to the digital multimeter; and
    displaying the pressure detected by the pressure sensor.

13. The method as in claim 12, further comprising zeroing the adapter.

14. The method as in claim 12, further comprising connecting the adapter to a power source.

15. The method as in claim 14, wherein the power source is a battery.

16. The method as in claim 12, wherein the pressure sensor is a transducer.

17. The method as in claim 12, wherein the pressure sensor detects pressure beyond 500 pound per square inch.

18. A tool for measuring pressure and vacuum data in a system comprising:
    at least one means for detecting pressure in the system, wherein the means for detecting is linked apart from an adapter;
    means for transmitting the pressure to the adapter, wherein the adapter, which is configured to be connected to a digital multimeter, is comprised of a power source and a converter;
    means for converting the pressure to a signal to be read by the digital multimeter;
    means for transmitting the signal to the digital multimeter;
    means for displaying the pressure detected by the sensor on the digital multimeter.

19. The method as in claim 18, further comprising means for zeroing the adapter.

20. The method as in claim 18, wherein the power source is a battery.

21. The method as in claim 18, further comprising means for connecting the adapter to a power source.

22. The method as in claim 18, wherein the means for detecting pressure sensor is a transducer.

23. The method as in claim 18, wherein the means for detecting pressure detects pressure beyond 500 pound per square inch.

24. A pressure adapter for use with a digital tester comprising:
   a power source;
   a converter linked to the power source, wherein the converter is configured to receive a measurement and convert it to a digital signal; and
   an interchangeable pressure sensor linked apart from the power source and the converter, wherein a pressure is detected and transmitted to the converter.

* * * * *